United States Patent Office 3,702,840
Patented Nov. 14, 1972

3,702,840
REDUCTION OF POLYMER BUILD-UP IN ETHYLENE COPOLYMERIZATION
Bart A. Diliddo, Seven Hills, and Bernard F. Cinadr, Brecksville, Ohio, assignors to The B. F. Goodrich Company, New York, N.Y.
No Drawing. Filed Oct. 31, 1968, Ser. No. 772,373
The portion of the term of the patent subsequent to Feb. 22, 1989, has been disclaimed
Int. Cl. C08f 1/11, 15/40
U.S. Cl. 260—80.78                      8 Claims

ABSTRACT OF THE DISCLOSURE

In the suspension polymerization of ethylene, propylene and a polyene in the substantial absence of extraneous diluents, particularly in a continuous system, where polymer build-up interferes with the polymerization reaction and causes mechanical problems, the amount of polymer build-up is reduced by including in the polymerization system minor amounts of a solubilizing agent which comprises less than 30% of the total hydrocarbons present in the reaction mixture.

BACKGROUND OF THE INVENTION

Elastomeric vulcanizable copolymers of ethylene, propylene and a polyene are normally prepared in systems containing large quantities of diluents or solvents, as 10 to 1 of diluent to olefins being polymerized. A system essentially free of extraneous solvents and containing substantially monomers only is described in U.S. Pat. 3,370,052. There are many advantages to such a system as compared to systems containing large quantities of diluents or solvents, but we have found that in the copolymerization of ethylene, propylene and a polyene in this system wherein the propylene is present in amount to produce a copolymer containing less than 50 weight percent propylene, that excessive polymer build-up occurs during polymerization. Such polymer build-up, particularly in continuous systems, interferes with the polymerization reaction, results in poor polymerization control, irregular reaction rates, mechanical problems are encountered in pumping and cleaning the equipment, and uniform polymers are not obtained. The polymer build-up problem is particularly noticeable when a norbornene as ethylidene norbornene and/or aliphatic dienes as 1,4-hexadiene are copolymerized with ethylene and propylene to form vulcanizable elastomers. It was also observed that as the molecular weight of the copolymers increases, and/or as the temperature of polymeriztaion is decreased, the polymer build-up problem becomes aggravated and catalyst efficiency decreases.

SUMMARY OF THE INVENTION

In the polymerization of ethylene, propylene and a polyene with a reduced vanadium catalyst, polymer build-up during the reaction is substantially reduced when there is included in the polymerization reaction mixture from above 5 to less than about 30 volume percent, based on the propylene, of a solubilizing agent, for example, a hydrocarbon containing 6 to 10 carbon atoms.

DETAILED DESCRIPTION

The monomers polymerized in accordance with this invention are ethylene, another α-olefin as propylene or butene-1 and a polyene; including for example, 1,4-hexadiene, ethylidene norbornene, dicyclopentadiene, methyl tetrahydroindene and the like. Many of the known polyenes, of which there are many, which are copolymerized with ethylene to provide unsaturation in the resulting copolymer may be used. The polyenes normally are aliphatic and alicyclic polyenes containing 4 to 10 carbon atoms and at least two $>C=C<$ groups. The copolymers normally have average molecular weights above 20,000 and preferably above 50,000.

Such copolymers normally contain 50 mol percent or more of ethylene and less than about 15% of polyene. Particularly, useful are elastomeric interpolymers containing about 50 to less than 80 mol percent ethylene, at least 5 mol percent of propylene or butene-1, and the polyene in amount to provide in the interpolymer olefinic unsaturation represented by an iodine number of from about 2 to about 35. These polymers may contain from about 0.1 to 10% of 1,4-hexadiene, dicyclopentadiene, butadiene, the norbornenes, 1,4,9-decatriene, methyl heptadiene, cyclooctadiene, cyclodecadiene, 1,4-pentadiene and the like.

One component of the catalyst is a hydrocarbon soluble vanadium compound, including for example, vanadium tetrahalides, vanadium oxyhalides, vanadyl acetylacetonate and vanadyl haloacetylacetonates. Typical hydrocarbon soluble vanadium catalysts include vanadium tetrachloride, vanadium oxytrichloride, vanadium acetylacetonate, vanadyl acetylacetonate and the like.

The other catalyst component is an alkyl aluminum compound of the general formula $R_xAlX_y$ wherein R is an alkyl group containing 2 to 8 carbon atoms, X is halogen, $x$ is 1 to 3, $y$ is 0 to 2, and $x+y=3$. Typical compounds include triethyl aluminum, triisobutyl aluminum, diethylaluminum dichloride, ethyl aluminum sesquichloride, diisobutyl aluminum fluoride, ethyl aluminum difluoride and the like. One of the catalyst components must contain a halogen atom. The molar ratio of alkyl aluminum compound and hydrocarbon soluble vanadium compound will be between about 15 to 1 and 1 to 1 but the preferred molar ratio is between 10 to 1 and 2 to 1.

Modifiers may also be used as is well known to those skilled in the art including small amounts of hydrogen, diethyl zinc and the like.

A polymerization temperature in the range of about −80° C. to about 25° C. may be employed, but more normally a temperature range of −20° C. to about 10° C. is employed and except at very low temperatures the polymerizations are normally conducted under pressure. The pressure at which the polymerization reactions are conducted normally range from about 25 to about 100 p.s.i.g., that is, about 2 to 7 atmospheres. At temperatures in the range of about −20 to about 10° C. pressures normally will be about 60 to 90 p.s.i.g.

At the conclusion of polymerization reaction, it is desired to destroy or deactivate the catalyst and this is efficiently done by contacting the polymerization mixture containing unreacted monomers and the active vanadium catalyst with an aliphatic alcohol or ketone.

The polymerization mixture to which the alcohol or ketone is to be added normally is removed from the reactor before adding the alcohol or ketone so as not to contaminate the reaction zone which may be a vessel or a line with the short-stop. The alcohol or ketone is normally added in the effluent line from the reactor, which line may be of sufficient length, shape, and size to provide hold-up time for reaction of the alcohol or ketone with the vanadium catalyst. Thereafter the polymer is washed with a hydrocarbon and/or caustic solution to remove the catalyst residue.

The solubilizing agents which contribute to decreasing polymer build up in the polymerization system are hydrocarbons containing 6 to 10 carbon atoms, including for example, benzene, cyclohexane, toluene; and the like. The amount of agent used is critical and is based for convenience on the amount of propylene employed in the system. There must be present more than 5 volume percent and less than about 25 volume percent of the total volume of propylene and hydrocarbon. Excellent results have been obtained within the range of about 10 to about 20 volume percent. It was quite surprising to find that when more than 30 volume percent of defined hydrocarbon, based on the total hydrocarbon in the reaction mixture, is employed, that the polymer build-up on reactor walls and agitator, if used, is as bad as when there is no hydrocarbon present.

The hydrocarbon is useful in decreasing polymer build-up in batch or continuous systems and in batch systems while it is normally added with the other ingredients, it may be proportioned in. There may be some difference in the efficiency of hydrocarbons as hexane and toluene so that exactly equivalent results may not be obtained with the same volume concentration, but suitable variation within the ranges set forth herein are readily made by those skilled in the art.

The use of the defined hydrocarbons has been described in suspension polymerization systems in which there are no substantial amounts of extraneous diluents. However, the process of the invention provides some improvement in systems containing up to a volume ratio of 2:1 of non-monomer diluent as propane. There normally will be present small amounts of solvents used in adding the catalyst constituents and these, of course, may be toluene, hexane, perchloroethylene and the like, usually in amounts less than 5% based on the propylene in the reactor, and if a hydrocarbon is used for this purpose containing 6 to 10 carbon atoms, as defined herein for such use, the total amount of such hydrocarbons plus that added should be less than about 30 volume percent of the total hydrocarbons present in the reaction mixture.

EXAMPLE I 1010 grams propylene and 143 grams of methyl tetrahydroindene were charged to a two liter stirrer reactor at a temperature of −10° C. at a pressure of 82 p.s.i.g. Ethylene and hydrogen were added until there was 35 mol percent ethylene and 4 mol percent hydrogen in the vapor phase. Polymerization was initiated by adding vanadium tris-acetylacetonate in perchloroethylene and isobutyl aluminum chloride dissolved separately. A total of 0.254 gram of vanadium tris-acetylacetonate in 23.54 grams of perchloroethylene and 1.212 grams of diisobutyl aluminum chloride in 9.48 grams of hexane were added during the four hour reaction. Constant monomer compositions are maintained in a liquid phase by maintaining the reactor at a constant temperature and pressure. The rate of ethylene being fed was controlled by polymerization temperature at constant pressure, so as to maintain about 35 mol percent ethylene in the vapor phase in the reactor. Unless one is able to maintain these conditions in the reactor it is difficult to make specification polymer and the reaction is essentially out of control. As the polymerization began, a heavy build-up of polymer also began to build up on the wall above and below the liquid level. A heavy layer of polymer built up on the thermocouple and this caused the temperature readings in the liquid phase to be in error. When the polymer being formed in dispersion form reached only 4.3%, control of the reaction was lost and it was necessary to stop the reaction with methanol and remove the large amounts of polymer build-up in the reactor. The polymer formed had a dilute solution viscosity determined at 25° C. in toluene of 3.27.

This experiment was repeated with the addition of 148 grams (225 ml.) of benzene, added with the propylene and methyl tetrahydroindene. This represents a volume ratio of benzene to propylene of 1 to 8 (about 11%). The reaction was conducted in the same manner and in this instance there was no substantial polymer build-up in the course of the reaction, only a light film on the walls and agitator. The dispersion reached a total solids content of 20.9% polymer which had a dilute solution viscosity of 3.16.

The experiment was then repeated using 440 grams of benzene, a volume ratio of benzene to propylene of 1 to 3 (25%). After the polymerization was initiated, as in the case with no benzene, polymer build-up began rapidly and a thick layer accumulated above and below the liquid level on the walls. Control of the reaction was lost and the dispersion reached a total solids content of only 5.9%.

The polymerization was repeated again with 16 weight percent cyclohexane, based on the total of propylene and cyclohexane, and a successful polymerization was obtatined and the total solids in the dispersion reached about 15%.

EXAMPLE II

To further demonstrate the practice of the invention a continuous polymerization was conducted. 1909 grams of propylene, 445 grams of ethylene and 20.8 grams of ethylidene norbornene were charged per hour to the reactor along with catalyst components of 0.192 gram of vanadium tris-acetylacetonate dissolved in 65.2 grams of perchloroethylene and 0.629 gram of diethyl aluminum chloride dissolved in 26.8 grams of hexane; and 0.630 gram of diethyl zinc dissolved in 11.9 grams of hexane. 886 grams of benzene per hour were charged into the reactor and the temperature of polymerization was held at −5° C. at a pressure of 71 p.s.i.g. The total solids of the dispersion effluent from the reactor was 12.31% during about 12 hours operation. The residence time was 1.3 hours. The dry polymer obtained, after stopping the reaction with methanol, washing with 3% caustic solution and drying, had a dilute solution viscosity of 2.541 and a polymer composition of 64.1% ethylene, 33% propylene and 2.9% ethylidene norbornene.

This continuous polymerization was then repeated without benzene. The total solids of the polymer slurry from the reactor varied from 0 to 4% during the first seven hours of the run and as the total solids in dispersion increased from about 6 to 8%, polymer build-up increased to such high levels that the agitator motor became very hot and the reaction had to be stopped after only 11 hours of polymerization.

In another continuous polymerization where toluene was used in place of benzene equally good results were obtained and the total solids of the reactor effluent was 17.1%. The dry polymer had a dilute solution viscosity of 1.57 and a polymer composition of 50.7% ethylene, 44% propylene and 5.3% 5-ethylidene-2-norbornene. This polymer had a raw Mooney value of 57 ml. at 212° F. in 10 minutes.

A sample of this copolymer was compounded, based on weight parts per 100 weight parts of polymer, with 75 FEF carbon black, 25 processing naphtha oil, 5 zinc oxide, 1 stearic acid, 1.5 sulfur, 1.5 mercaptobenzothiazole, 0.8 tetramethylthiuram disulfide, 0.8 dipentamethylenethiuram tetrasulfide, 1.5 octadecyl - 3 - (3,5 - di-t-butyl-4-hydroxyphenyl)propionate. Samples of the compounded stock were cured at 320° F. for 25 minutes. Tensile strength was 2275 p.s.i., elongation 230% and the Durometer A hardness 73.

EXAMPLE III 6311 grams of propylene, 738 grams of 1,4-hexadiene and 3 grams of diethyl zinc were charged to a 5 gallon stirred reactor at a temperature of −10° C. Ethylene was added until there was present in the vapor phase of the reactor 36 mol percent ethylene and this was maintained during the reaction. The polymerization was initiated with vanadium tris-acetylacetonate and diethyl aluminum chloride and a total of 0.753 gram of vanadium acetylacetonate in 76.33 grams of perchloroethylene and 1.93 grams of diethyl aluminum chloride in 10 grams of hexane and 2.67 grams of heptane were added during the course of the polymerization. After 3.25 hours the reaction was stopped with methanol, the unreacted monomers flashed and the reactor opened. Very heavy build-up of polymer was observed in the reactor on the walls, the agitator and a mass remaining in the reactor. Of the total polymer recovered, 863 grams, 609 (70.5%) was build-up. The remainder was polymer in suspension.

This polymerization was repeated to the same recipe and procedure with the addition of 1641 grams of benzene. In this run, the total solids of the dispersion was 10.7% and 1022 grams polymer were recovered. Less than 5% of the total polymer formed was build-up in the reactor.

The ethylene-propylene-polyene copolymers prepared in accordance with this invention find particular utility in automobile tires and in white or light colored ozone resistant compositions as is well known to those skilled in the art.

We claim:

1. In a suspension polymerization of olefin monomers ethylene, propylene and a polyene containing 4 to 10 carbon atoms and at least two >C=C< groups in amounts to provide in the copolymer about 30 to less than 80 mol percent ethylene and about 0.1 to about 10% polyene, in the essential absence of extraneous solvents, with a catalyst of a hydrocarbon soluble vanadium compound and an alkyl aluminum compound of the formula $R_xAlX_y$ where R is an alkyl group containing 2 to 8 carbon atoms, X is halogen, $x$ is 1 to 3, $y$ is 0 to 2 and $x+y=3$, at least one of which contains a halogen atom, under pressure at a temperature from about $-80°$ C. to about $25°$ C., the improvement which comprises conducting the copolymerization of the monomers in the presence of from greater than 5 to less than 25 volume percent of a hydrocarbon solubilizing agent selected from the group consisting of benzene, cyclohexane and toluene based on the total volume of propylene and solubilizing agent.

2. The method of claim 1 wherein amounts of ethylene, propylene and the polyene are present in amounts to provide in the copolymer more than 50 mol percent ethylene, at least 5 mol percent propylene and from 1/10 to 10% polyene, the vanadium catalyst is a hydrocarbon soluble salt and the solubilizing agent is present in amount from about 10 to 20 volume percent.

3. The method of claim 2 wherein the polyene is selected from the group consisting of 1,4-hexadiene, dicyclopentadiene, the norbornenes, and 1,4,9-decatriene; the vanadium compound is an acetylacetonate, $y$ is 1 to 2.

4. The method of claim 3 wherein the polyene is ethylidene norbornene and the vanadium compound is an acetylacetonate, $y$ is 1 to 2.

5. The method of claim 3 wherein the polyene is 1,4-hexadiene and the vanadium compound is an acetylacetonate, $y$ is 1 to 2.

6. The method of claim 3 wherein the polyene is 1,4-hexadiene or ethylidene norbornene and the vanadium compound is a vanadium oxysalt.

7. The method of claim 4 wherein the hydrocarbon is benzene.

8. The method of claim 5 wherein the hydrocarbon is benzene.

References Cited
UNITED STATES PATENTS

| | | | |
|---|---|---|---|
| 3,205,216 | 5/1965 | McManimie | 260—94.9 |
| 3,225,021 | 12/1965 | Erchak | 260—93.7 |
| 3,506,627 | 4/1970 | Zaim | 260—80.7 |
| 3,520,859 | 7/1970 | Schrage et al. | 260—80.78 |
| 3,577,393 | 5/1971 | Schrage et al. | 260—80.78 |
| 3,436,380 | 4/1969 | Davison | 260—94.9 |
| 3,644,311 | 2/1972 | Diliddo et al. | 260—80.78 |

JAMES A. SEIDLECK, Primary Examiner

E. J. SMITH, Assistant Examiner

U.S. Cl. X.R.

260—80.7, 94.9 p